United States Patent [19]

Kuroha

[11] 4,097,116
[45] Jun. 27, 1978

[54] MICROSCOPE STAGE

[75] Inventor: Noboru Kuroha, Yokohama, Japan

[73] Assignee: Nippon Kogaku K.K., Tokyo, Japan

[21] Appl. No.: 739,335

[22] Filed: Nov. 5, 1976

[30] Foreign Application Priority Data

Nov. 10, 1975 Japan .................................. 50-133968

[51] Int. Cl.² ............................................ G02B 21/26
[52] U.S. Cl. ...................................... 350/86; 350/239
[58] Field of Search .................. 350/86, 239; 108/137, 108/143

[56] References Cited

U.S. PATENT DOCUMENTS 2,914,952  12/1959  Frischmann .................. 350/86 X
3,826,559  7/1974  Berliner et al. ..................... 350/86

Primary Examiner—John K. Corbin
Assistant Examiner—Matthew W. Koren
Attorney, Agent, or Firm—Shapiro and Shapiro

[57] ABSTRACT

In a microscope stage device comprising a first and a second stage movable in Y- and X-direction, respectively, by means of a first and a second rotatable member operable by two handles mounted for rotation about a single shaft, there are provided first and second transmission means provided between one of the two handles and the first rotatable member and between the other handle and the second rotatable member, respectively, to adjust the amount of movement of each of the stages caused by rotation of each of the handles so that when each of the handles is rotated within a predetermined angle of rotation, each of the stages corresponding to each of the handles is moved for fine adjustment and when each of the handles is rotated beyond the predetermined angle of rotation, each of the stages corresponding to each of the handles is moved for coarse adjustment.

7 Claims, 5 Drawing Figures

MICROSCOPE STAGE

BACKGROUND OF THE INVENTION

1. Field of the Invention

This invention relates to a device which effects movement of a microscope stage in X- and Y-direction by a single-shaft system and also enables coarse and fine adjustments of the stage.

2. Description of the Prior Art

In a photometric microscope, it is necessary that the portion thereof which is concerned with photometry be small and such portion be accurately aligned with the optical axis of the microscope. In some cases, the accuracy of alignment must be in the unit of micron (1/1000 of a millimeter) and this is hardly possible with the conventional observation stage having coarse adjustment only. Also, in the case of microscopic photograph, it is difficult with the observation stage having coarse adjustment only to accurately align the portion to be photographed with the angle of view of the photograph, and the result in unsatisfactory.

In these cases, therefore, the provision of a fine adjustment mechanism would be very convenient. However, if the conventional coarse adjustment is simply replaced by fine adjustment, unnecessary portions will have to be moved by the fine adjustment and this will mean much loss of time.

On the other hand, movement of the stage requires the use of two operating handles, namely, one for X-direction movement and one for Y-direction movement. In terms of operability and simplification of the device, these handles should preferably be of the single-shaft type in which the two handles are mounted on a single shaft, instead of two discrete shafts. However, the microscopes having the conventional single-shaft type handles have only permitted coarse adjustment of the stage and not fine adjustment thereof.

SUMMARY OF THE INVENTION

In view of this, it is an object of the present invention to provide a microscope stage device having single-shaft type handles which of course enable coarse adjustment and if required, fine adjustment, also, of the microscope stage in X- and Y-direction.

To achieve such an object, the microscope stage device of the present invention comprises a first stage slidable in one direction with respect to the stationary portion of the main body of a microscope, a first rotatable member rotatably supported on a shaft secured to the first stage and threadably engaged with the stationary portion so as to move the first stage upon rotation of the first rotatable member, a second stage provided on the first stage for sliding movement in a direction perpendicular to the direction of sliding movement of the first stage, a second rotatable member rotatably supported on the shaft and threadably engaged with the second stage so as to move the second stage, and a pair of operating handles mounted for rotation about the shaft to individually operate each of the first and the second rotatable member.

A feature of the present invention is that first and second transmission means is provided between one of the pair of handles and the first rotatable member and between the other handle and the second rotatable member, respectively, to adjust the amount of movement of each of the stages caused by rotation of each of the handles so that for angular rotation of each of the handles within a predetermined angle of rotation, each of the stages corresponding to each of the handles is moved for fine adjustment and for rotation of each of the handles beyond the predetermined angle of rotation, each of the stages corresponding to each of the handles is moved for coarse adjustment.

The above object and other features of the present invention will become fully apparent from the following detailed description of the invention taken in conjunction with the accompanying drawings.

DESCRIPTION OF THE PREFERRED EMBODIMENTS

Figure 1:
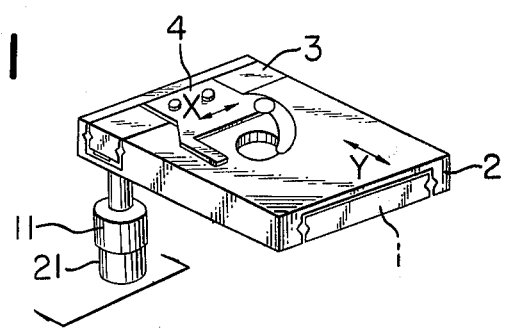
FIG. 1 is a perspective view showing the appearance of the microscope stage according to the present invention.

Referring to FIG. 1 which is a pictorial perspective view of the microscope stage according to the present invention, a stage body 1 is secured to the main body of a microscope and has V-shaped grooves formed in the opposite sides thereof. A Y-direction movable stage 2 is formed with V-shaped grooves opposed to the V-shaped grooves formed in the stage body 1 and is movable in the Y-direction by means of bearing balls disposed between the V-shaped grooves of the stage body and those of the Y-direction movable stage. An X-direction movable stage 3 is formed with V-shaped grooves extending in a direction perpendicular to the V-shaped grooves of the movable stage 2 and is movable in the X-direction perpendicular to the Y-direction by means of bearing balls. Secured to the X-direction movable stage 3 is a specimen holder 4 for holding a preparation (prüparat) with a specimen attached thereto. A handle 11 is provided to move the Y-direction movable stage 2, and a handle 21 is provided to move the X-direction movable stage 3.

Figure 2:
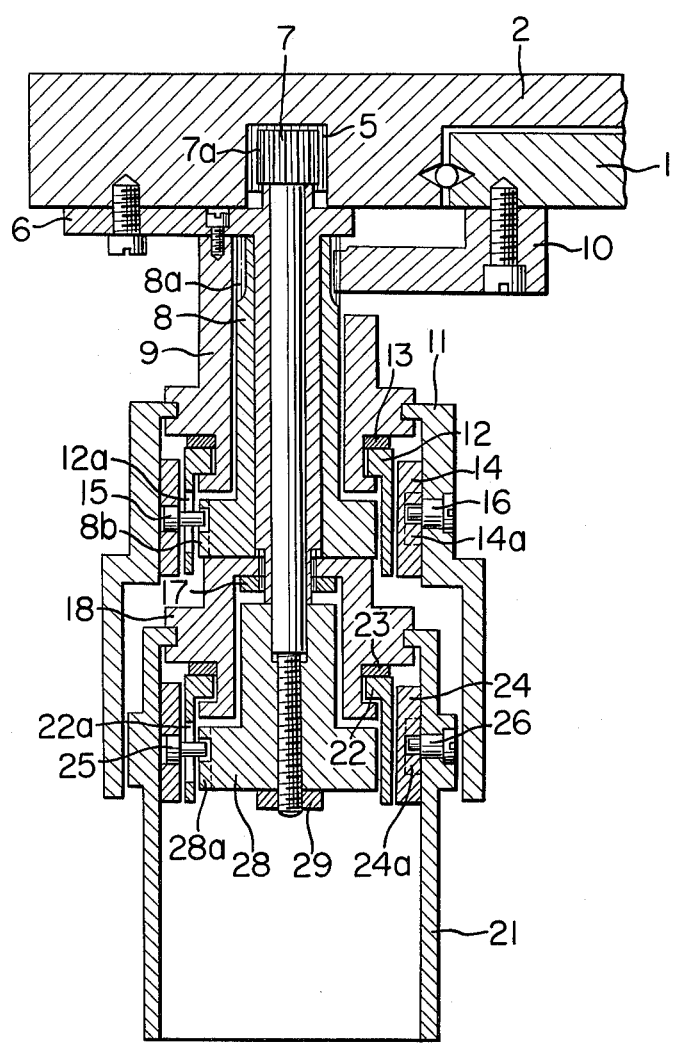
FIG. 2 is a cross-sectional view showing the driving mechanism for the microscope stage of the present invention.
Figure 3A:
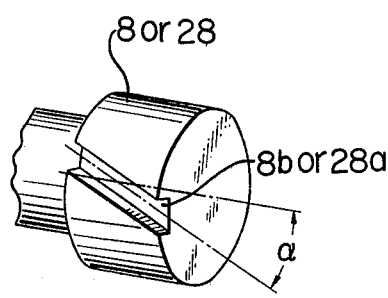
FIGS. 3A to 3C illustrate the essential portions of the microscope stage.
Figure 3B:
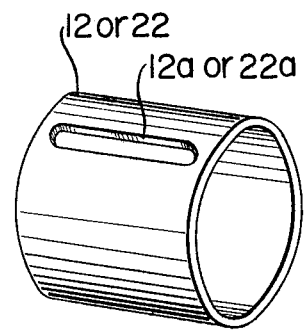
Figure 3C:
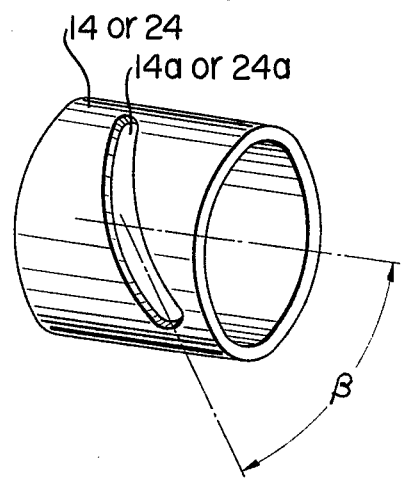

Reference will now be had to FIG. 2 which is a cross-sectional view showing a mechanism for moving the Y-direction and the X-direction movable stage. In FIG. 2, a sleeve 6 having a flanged portion is fixed to the Y-direction movable stage 2 by means of a screw with the flanged portion interposed therebetween. A pinion shaft 7 is rotatably fitted within the sleeve 6 and has a pinion 7a integrally formed on the upper end thereof. The pinion 7a is in meshing engagement with a rack 5 provided in the X-direction movable stage 3. A pinion shaft 8 is rotatably fitted on the outside of the sleeve 6 and has a pinion 8a integrally formed on the upper end thereof. The other end of the pinion shaft 8 is formed with a lead groove 8b, as shown in FIG. 3A. The lead groove 8b is inclined by an angle $\alpha$ with respect to the axis of the pinion shaft 8. A sleeve 9 is fixed to the flanged portion of the sleeve 6 by means of a screw and has the pinion shaft 8 disposed rotatably therein. A portion of the sleeve 9 is formed with a cut-away through which the pinion 8a may be exposed. A rack 10 is secured to the stage body 1 by means of a screw and in meshing engagement with the pinion 8a. The aforementioned handle 11 is rotatably mounted on the fixed member 9. A rotatable body 12 is mounted on the fixed sleeve 9 and a straight motion groove 12a formed axially thereof, as shown in FIG. 3B. A friction member 13 such as spring washer or the like is disposed between the rotatable body 12 and the fixed sleeve 9. Thus, the rotatable body 12 is rotatable when an extraneous force greater than the friction force of the friction member 13 is exerted thereon. A sliding member 14 is rotatably and slidably disposed between the handle 11 and the rotatable body 12. The sliding member 14 is formed with a lead groove 14a as shown in FIG. 3C. The lead groove 14a is inclined by an angle β with respect to the axis of the sliding member 14. The sliding member 14 also has a pin 15 secured thereto for engagement with the lead groove 8b in the pinion shaft and the straight motion groove 12a in the rotatable body 12. A pin 16 for engagement with the lead groove 14a in the sliding member 14 is secured to the handle 11. Double nuts 17 and 18 are threadably coupled to one end of the fixed member 6 and securely screwed to such an extent that it does not interfere with the rotation of the pinion shaft 8. The aforementioned handle 21 is rotatably mounted on the nut 18. A rotatable body 22, which is entirely identical with the rotatable body 12, is mounted on the nut 18. A friction member 23 such as spring washer or the like is disposed between the rotatable body 22 and the nut 18, and the rotatable body 22 is rotatable upon exertion thereon of an extraneous force greater than the friction force of the friction member 23. A sliding member 24, which is entirely identical with the sliding member 14, is rotatably and slidably disposed between the rotatable body 22 and the handle 21. A pin 25 is secured to the sliding member 24. A pin 26 for engagement with the lead groove in the sliding member 24 is secured to the handle 21. A member 28 is secured to the pinion shaft 7 by means of a nut 29 and has a lead groove 28a formed therein, as shown in FIG. 3A. The pin 25 is engaged in the lead groove 28a of the member 28 and the straight motion groove 22a of the rotatable member 22.

The microscope stage according to the present invention is constructed as described above. Thus, rotation of the handle 11 causes the sliding member 14 to be slid along the straight motion groove 12a of the rotatable body 12 by the pin 16. When this occurs, the rotatable body 12 is prevented from rotating by the friction member 13. With the sliding movement of the sliding member 14, the pinion shaft 8 is slightly rotated by an amount corresponding to the taper of the lead groove 8b, because the pin 15 is engaged with the lead groove 8b in the pinion shaft 8. Such rotation of the pinion shaft 8 is transmitted through the pinion 8a to the rack 10. Since the rack 10 is fixed to the stage body 1 integrally formed with the microscope body, the Y-direction movable stage 2 is moved in the Y-direction. Upon arrival of the pin 16 at one end of the lead groove 14a, the sliding member 14 is rotated with the handle 11. If the force of this rotation is greater than the friction force of the friction member 13, the rotatable member 12 is also rotated by the pin 15. Since the pin 15 is engaged also with the lead groove 8b in the pinion shaft 8, this pinion shaft 8 is also rotated with the handle 11 after all, whereby coarse adjustment of the Y-direction movable stage 2 is accomplished. When the handle 11 is rotated in the opposite direction, the sliding member 14 is caused to slide in the opposite direction by the pin 16. Also, the pinion shaft 8 is slightly rotated by an amount corresponding to the taper of the lead groove 8b. Thus, fine adjustment of the Y-direction movable stage 2 is accomplished.

When the handle 11 is further rotated until the pin 16 strikes against the other end of the lead groove 14a, the Y-direction movable stage 2 is brought to a position of coarse adjustment. Rotation of the handle 21, like the rotation of the handle 11, causes rotation of the pinion shaft 7 which is in turn transmitted through the pinion 7a to the rack 5 to thereby accomplish coarse and fine adjustments of the X-direction movable stage 3.

Interchange of the stage for the ordinary observation microscope with the stage of the present invention may be very easily carried out by using a common screw for securing the fixed member 6. The foregoing embodiment has been described with respect to the case where the handles extend downwardly with respect to the stage, but the present invention is readily applicable to a stage having handles extending laterally thereof.

According to the present invention, as has been described above, coarse and fine adjustments of the microscope stage in the X- and Y-direction can be accomplished by a single-shaft system and thus, accurate positioning of the specimen can be accomplished easily and quickly.

What is claimed is:

1. A microscope stage device comprising a first stage slidable in one direction with respect to the stationary portion of the main body of a microscope, a first rotatable member rotatably supported on a shaft secured to said first stage and threadably engaged with said stationary portion so as to move said first stage upon rotation of said first rotatable member, a second stage provided on said first stage for sliding movement in a direction perpendicular to the direction of sliding movement of said first stage, a second rotatable member rotatably supported on said shaft and threadably engaged with said second stage so as to move said second stage, and a pair of operating handles mounted for rotation about said shaft to individually operate each of said first and said second rotatable member, the improvement residing in:

first and second transmission means provided between one of said pair of handles and said first rotatable member and between the other handle and said second rotatable member, respectively, to adjust the amount of movement of each of said stages caused by rotation of each of said handles so that for angular rotation of each of said handles within a predetermined angle of rotation, each of said stages corresponding to each of said handles is moved for fine adjustment and for rotation of each of said handles beyond said predetermined angle of rotation, each of said stages corresponding to each of said handles is moved for coarse adjustment.

2. A microscope stage device according to claim 1, wherein each of said first and second transmission means is provided so as to continuously rotate said rotatable member by a slight amount for angular rotation of said handle within said predetermined angle of rotation and to impart to said rotatable member angular rotation equal to that of said handle for angular rotation of said handle beyond said predetermined angle of rotation.

3. A microscope stage device according to claim 2, wherein each of said pair of transmission means includes:

means slidable axially of said rotatable shaft for angular rotation of said handle within said predetermined angle of rotation and rotatable with said handle for angular rotation of said handle beyond said predetermined angle of rotation to operate said rotatable member; and means for converting the sliding movement of said means into rotational movement of said rotatable member.

4. A microscope stage device according to claim 3, wherein said means for operating said rotatable member includes:

a sliding member slidable within a predetermined range of sliding movement which determines said predetermined angle of rotation of said handle, said sliding member being mounted for rotation with said handle;

means for sliding said sliding member within said predetermined range of sliding movement upon rotation of said handle; and a control member for preventing rotation of said sliding member when the latter is within said predetermined range of sliding movement.

5. A microscope stage device according to claim 4, wherein said conversion means includes:

a camming groove formed in said rotatable member; and a pin engaged in the groove and secured to said sliding member.

6. A microscope stage device according to claim 5, wherein said means for sliding said sliding member includes:

a camming groove formed in said sliding member; and a pin engaged in the groove and secured to said handle.

7. A microscope stage device according to claim 5, wherein said control member includes:

a rotatable body having a camming groove parallel to said rotatable shaft and engaged by said pin, said rotatable body being mounted for rotation about said shaft; and a friction member disposed between said rotatable body and said main body.

* * * * *